United States Patent
Sudhakar et al.

(10) Patent No.: US 8,396,221 B2
(45) Date of Patent: Mar. 12, 2013

(54) SECURE BROADCASTING AND MULTICASTING

(75) Inventors: Gosukonda Naga Venkata Satya Sudhakar, Bangalore (IN); Ashwin Anand Shenvi, Hyderabad (IN)

(73) Assignee: Oracle International Corporation, Redwood Shores, CA (US)

( * ) Notice: Subject to any disclaimer, the term of this patent is extended or adjusted under 35 U.S.C. 154(b) by 873 days.

(21) Appl. No.: 11/897,445

(22) Filed: Aug. 30, 2007

(65) Prior Publication Data

US 2008/0152148 A1 Jun. 26, 2008

(30) Foreign Application Priority Data

Dec. 21, 2006 (IN) .......................... 2748/DEL/2006

(51) Int. Cl.
*H04L 29/06* (2006.01)
(52) U.S. Cl. ...................... 380/277; 380/278; 380/279
(58) Field of Classification Search ........... 380/277–279
See application file for complete search history.

(56) References Cited

U.S. PATENT DOCUMENTS

| | | | | |
|---|---|---|---|---|
| 4,658,292 A * | 4/1987 | Okamoto et al. | ............. | 380/239 |
| 5,748,736 A | 5/1998 | Mittra | | |
| 6,041,408 A | 3/2000 | Nishioka et al. | | |
| 6,304,659 B1 | 10/2001 | Gold et al. | | |
| 6,330,671 B1 | 12/2001 | Aziz | | |
| 6,393,128 B1 | 5/2002 | Rix et al. | | |
| 6,512,829 B1 | 1/2003 | Nishioka et al. | | |
| 6,587,561 B1 | 7/2003 | Sered et al. | | |
| 7,089,211 B1 | 8/2006 | Trostle et al. | | |
| 2002/0141574 A1* | 10/2002 | Henson et al. | ................... | 380/44 |
| 2003/0061481 A1 | 3/2003 | Levine et al. | | |
| 2003/0163690 A1 | 8/2003 | Stewart | | |
| 2004/0049515 A1* | 3/2004 | Haff et al. | ...................... | 707/100 |
| 2005/0010774 A1 | 1/2005 | Rose et al. | | |
| 2005/0050333 A1 | 3/2005 | Yeap et al. | | |
| 2005/0108575 A1* | 5/2005 | Yung | ............................. | 713/201 |
| 2006/0023876 A1 | 2/2006 | Ksontini et al. | | |
| 2006/0168446 A1 | 7/2006 | Ahonen et al. | | |
| 2007/0095927 A1* | 5/2007 | Pesonen | ........................ | 235/492 |
| 2008/0002696 A1* | 1/2008 | Claessens et al. | ............ | 370/392 |

OTHER PUBLICATIONS

"Introduction to Securing Data in Transit". Retrieved Jan. 28, 2011 from http://tldp.org/REF/INTRO/SecuringData-INTRO/encryption.html.*
RSA, "What is Diffie Hellman?" Retrieved May 4, 2011 from http://www.rsa.com/rsalabs/node.asp?id=2248, pp. 1-2.*
CyLink, CyKey:CyLink's Key Recovery Solution, pp. 1-9, Mar. 13, 1997.*

* cited by examiner

*Primary Examiner* — Jason K. Gee
*Assistant Examiner* — Lisa Lewis
(74) *Attorney, Agent, or Firm* — Kilpatrick Townsend & Stockton LLP

(57) ABSTRACT

Techniques are presented for secure broadcasting and multicasting. Communications for multicasting and broadcasting are encrypted and decrypted using a secure communication key. The secure communication key is represented in a broadcast value that is sent to selected parties. The broadcast value represents the product of unique prime numbers and an additional number plus the secure communication key. Each party is represented by one of the unique prime numbers. Each party can acquire the secure communication key by dividing the broadcast value by its particular prime number to obtain a remainder, which is the secure communication key.

20 Claims, 3 Drawing Sheets

SECURE BROADCASTING AND MULTICASTING

RELATED APPLICATIONS

The present application claims priority to India Patent Application No. 2748/DEL/2006 filed in the India Patent Office on Dec. 21, 2006 and entitled "SECURE BROADCASTING AND MULTICASTING;" the disclosure of which is incorporated by reference herein.

FIELD

The invention relates generally to broadcasting and multicasting and more particularly to secure techniques for broadcasting and multicasting.

BACKGROUND

A variety of security mechanisms exists in the industry for communications between two parties or a limited number of parties. Some of these techniques include such things as public key infrastructure (PKI) techniques that utilize: private and public key pairs; digital certificates; digital signatures; secure sockets layer (SSL) protocols; etc.

Often when the number of parties involved in secure communications increase, the feasibility of traditional two-party or limited-party techniques degrade. For example, if 100 or more parties are using PKI techniques to securely communicate than the time spent by each party to encrypt and decrypt communications can be enormous and can make such an approach impractical.

This type of situation is often presented with television programming or video on demand programming because the potential size of the parties associated with broadcast or multicast content can be very large. Consequently, broadcasting and multicasting service providers have elected to take a different approach.

One such approach includes distributing physical hardware, such as digital subscriber boxes or satellite boxes associated with satellite television program services. Typically, these boxes or other devices (phones, etc.) include a smart card that includes a key used to decrypt and perhaps encrypt communications received or sent. However, if the key of a particular device or box is compromised (stolen) then in order to ensure legitimate use each of the remaining keys on the remaining legitimate devices or boxes have to be changed. This is costly and impractical; so much so that a service provider may elect to permit some unlawful use of its content until a large enough number of violators warrant updating the keys on the legitimate customer boxes or devices.

Therefore, improved techniques for secure broadcasting and multicasting are desirable.

SUMMARY

In various embodiments, techniques are provided for secure broadcasting and multicasting. More particularly and in an embodiment, a secure communication key generating and distributing service is presented. The secure communication key generating and distributing service identifies multiple parties who are requesting secure communications with one another. A prime number associated with each party is acquired. A prime sum is calculated by multiplying each prime number together. The prime sum is further augmented by multiplying the prime sum against an additional number. Next, a secure communication key is added to the augmented prime sum to produce a broadcast value, and the broadcast value is then communicated.

DETAILED DESCRIPTION

As used herein, a "party" and "participant" may be used synonymously and interchangeably. A party or participant is a resource, such as a user, an automated service or application, and/or a device that engages in secure communications received over a network via a broadcast or multicast. A broadcast does not discriminate as to who is capable of receiving communications, whereas a multicast selectively sends communications to select parties over a network.

The phrase "secure communications" refers to communication that has been encrypted in some manner and that may or may not be transmitted using secure protocols over a network. Communications may be encrypted using a secure communication key and decrypted using the same secure communication key. In this manner, the key maybe viewed as being symmetric.

According to an embodiment, the techniques presented herein may be implemented within Novell products distributed by Novell, Inc. of Provo, Utah. Of course it is to be understood that any network architecture, device, proxy, or product may be enhanced to utilize and deploy the techniques presented herein and below.

Figure 1:
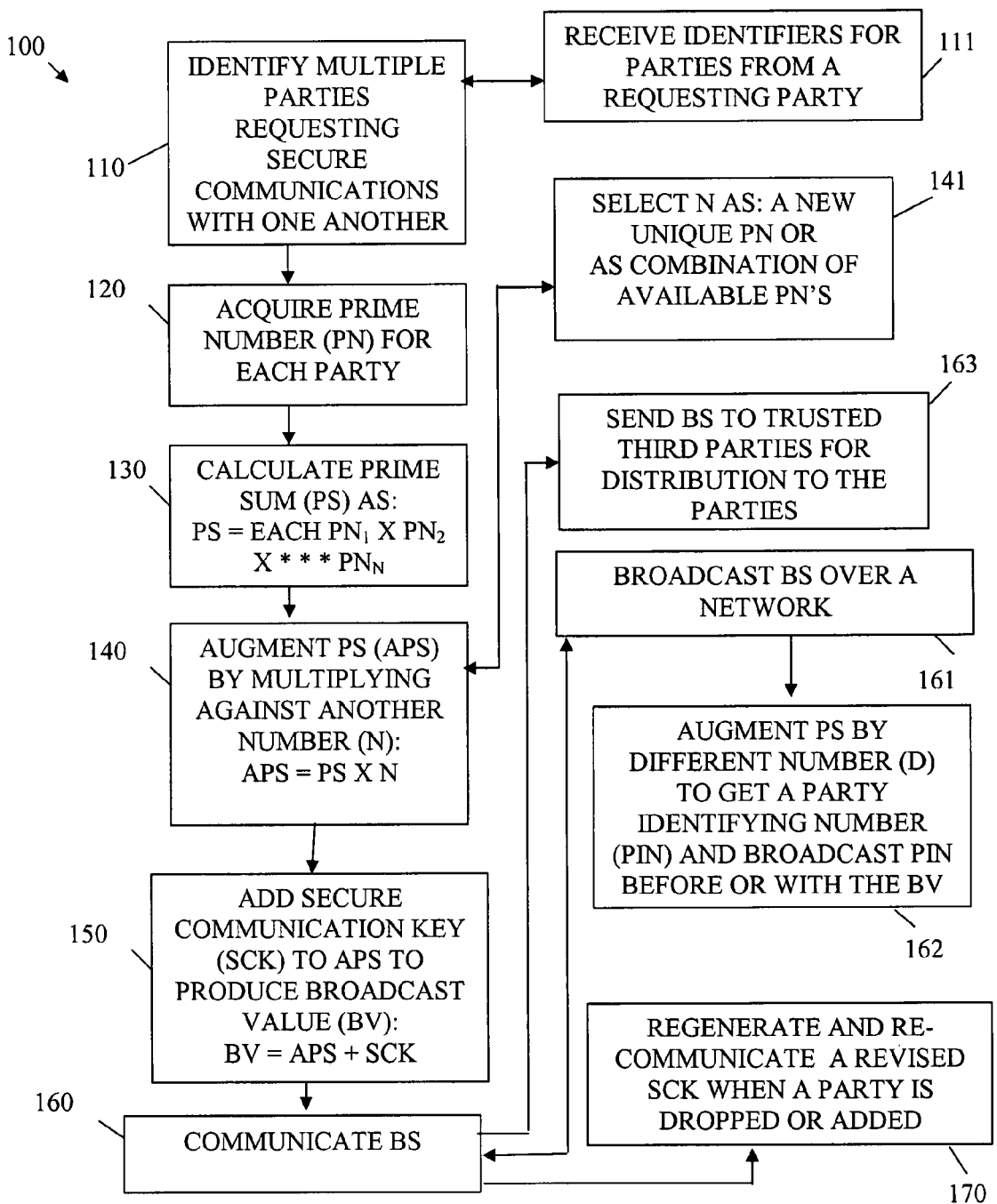
FIG. 1 is a diagram of a method for generating and distributing a secure communication key, according to an example embodiment.

FIG. 1 is a diagram of a method 100 for generating and distributing a secure communication key, according to an example embodiment. The method 100 (hereinafter "server key generation and distribution service") is implemented in a machine-access and machine-readable medium and is accessible over a network. The network may be wired, wireless, or a combination of wired and wireless.

The server key generation and distribution service may be implemented on a server or another node over a network as a service that can generate and distribute secure communication keys. The secure communication keys are used by receiving parties or participants to encrypt and decrypt communications associated with a broadcast or multicast communication.

At 110, the server key generation and distribution service identifies multiple parties requesting secure communications with one another. In some cases, at 111, this identification may have been made for the server key generation and distribution service by a requesting one of the parties. That is, a requesting party may customize a list of identifiers for the multiple parties and submit that as a request to the server key generation and distribution service for generating and distributing a new secure communication key.

Each party identified, at 110, includes an association with a unique prime number. It is of course understood that prime numbers are an infinite series of integer values, such that the supply of these numbers is unlimited and such that each party can have its own association with a particular prime number. The server key generation and distribution service does not communicate a particular party's prime number association. Although as will be discussed more completely below, the server key generation and distribution service may in some cases securely and in a trusted manner provide such associations on a limited bases to trusted third party helpers or assistants. But, this is done in a secure manner and just with trusted services (trusted third parties).

At 120, the server key generation and distribution service acquires the prime numbers for each of the identified parties and, at 130, the server key generation and distribution service calculates a prime sum. The prime sum is the product found by multiplying the prime numbers together. So, if there are 10 parties then the prime sum is the product of 10 prime numbers multiplied together.

At 140, the server key generation and distribution service augments the prime sum by multiplying it against another number (N), where N is an integer value. N can be selected in a variety of manners. For example, at 141, N may be selected as yet another unique prime number. Alternatively, at 141, N may be selected as some combination of available prime numbers. That is, a list of available prime numbers for use as N may be pre-established and a certain number of these may be selected, such as half of them, and then combined in some manner to generate N. This latter approach for selecting N may use nCr techniques; where n stands for any number of combinations C and r stands for the number of things being selected (e.g., half would be denoted as n/2). N ensures that parties cannot discover the prime numbers of other parties.

At 150, the server key generation and distribution service takes the augmented prime sum (prime sum×N) and adds to it a secure communication key that the server key generation and distribution service generates or obtains in some other manner. The augmented prime sum with the added secure communication key represents a broadcast value. The server key generation and distribution service may randomly generate the secure communication key, acquire it from another third party service and modify it, acquire it from a list of available secure communication keys, acquire it from another third party service and not modify it, etc. The only requirement of the secure communication key is that it cannot be equal to or greater than any of the original prime numbers used to generate the prime sum. As will be demonstrated below this ensures that each of the subsequent parties can reacquire or derive the secure communication key from the broadcast value.

Once the broadcast value is known it can be communicated to the proper parties over the network. Each party receives the broadcast value and divides it by that party's unique prime number. Each party is unaware of the remaining prime numbers associated with the remaining parties; but, each party is aware of its own unique prime number. The remainder of a division calculation by each participating party results in reproduction of the secure communication key. Example processing associated with each of the parties is presented below with reference to the method 200 and the FIG. 2.

As an example, consider three prime numbers 3, 5, and 7. The prime sum of these is 105. Now consider N as 11; the augmented prime sum is 1,155. If the secure communication key is 2 (less then each of the prime numbers), then the broadcast value is 1,157. Say now that a party associated with 3 receives the broadcast value of 1,157. When 1,157 is divided by 3 the result is 385 with a remainder of 2 and 2 is the original secure communication key. It is noted that the above example was presented for purposes of illustration as more prime numbers representing larger groups of parties and larger and/or more diverse prime numbers may be a more typical case.

According to an embodiment, at 161, the server key generation and distribution service may broadcast the broadcast value over a network. Just the parties intended to participate in the secure communications are capable of deciphering the broadcast value to obtain the embedded secure communication key. In some cases, at 162, the identities of the parties may similarly be encrypted as added security. In other words, the original prime sum may be multiplied by a different N to obtain a party identifying number (PIN). The PIN lacks any reference to the secure communication key. The PIN is the prime sum multiplied by the different N. When this is received by a party, that party can divide by its prime number. If the remainder is 0 or some other small number such as 1 or 2 (or small range of values), which is known to all, then that party concludes its prime number is represented in the PIN and will look for the broadcast value being transmitted by the server key generation and distribution service having the embedded secure communications key. There is also another less secure mechanism that may be used. If a party obtains a remainder less than the threshold value, which is again a small number, then the party concludes its prime number is represented in the PIN and will look for the broadcast value being transmitted by the server key generation and distribution service having the embedded secure communications key. The threshold value may also fall within a given or known range of small numbers, such as 2-5 (known range of values), etc. The PIN may be transmitted in advance and separate from the broadcast value or may in some cases accompany the broadcast value.

In some cases, at 163, the server key generation and distribution service may send the broadcast value or even the secure communication key to trusted third parties for subsequent distribution to the parties involved in the secure communication request. That is, the processing may use prime numbers associated with the trusted third parties to communicate the broadcast value and identify the parties that the server key generation and distribution service wants each trusted third party to handle. The trusted third party then uses the derived secure communication key to produce its own broadcast value that it sends to selective ones of the parties. This assumes the trusted third party is aware of the prime numbers of the parties it services, which could have been communicated prior to the request from the server key generation and distribution service to assist. In fact, the actual prime number associations may be stored in an identity vault that the server key generation and distribution service and the trusted third parties can dynamically access on demand using identifiers for the parties to acquire the prime number associations. The use of the trusted third parties permits large numbers for the broadcast value from being achieved or reached and permits the server key generation and distribution service and the trusted third parties to cooperate to communicate the secure communication key. Each trusted third party may use its own uniquely determined N and each may have its own unique subset of prime numbers representing the parties that it is directed to communicate the secure communication key to. The secure communication key itself may have been in the original broadcast value communicated by the server key generation and distribution service or may have been sent independent of the broadcast value by the server key generation and distribution service to the trusted third party services using another secure mechanism, such as perhaps via an identity vault that each can authenticate to and access according to policy.

According to an embodiment, at 170, the server key generation and distribution service may also re-generate and re-communicate a revised secure communication key when a particular party is added, dropped, or revoked from access. In other words, broadcast and multicast keys are not dependent on distributed devices they can be dynamically updated and altered on an as needed basis. So, instant changes can occur as soon as a particular prime key (party) is added, dropped, or believed to be compromised in some manner. All that is needed is for a new broadcast value to be broadcast over the network with a new secure communication key that excludes the compromised prime number associated with the compromised party or prime number of a dropped party or even includes the prime number of an added party.

Figure 2:
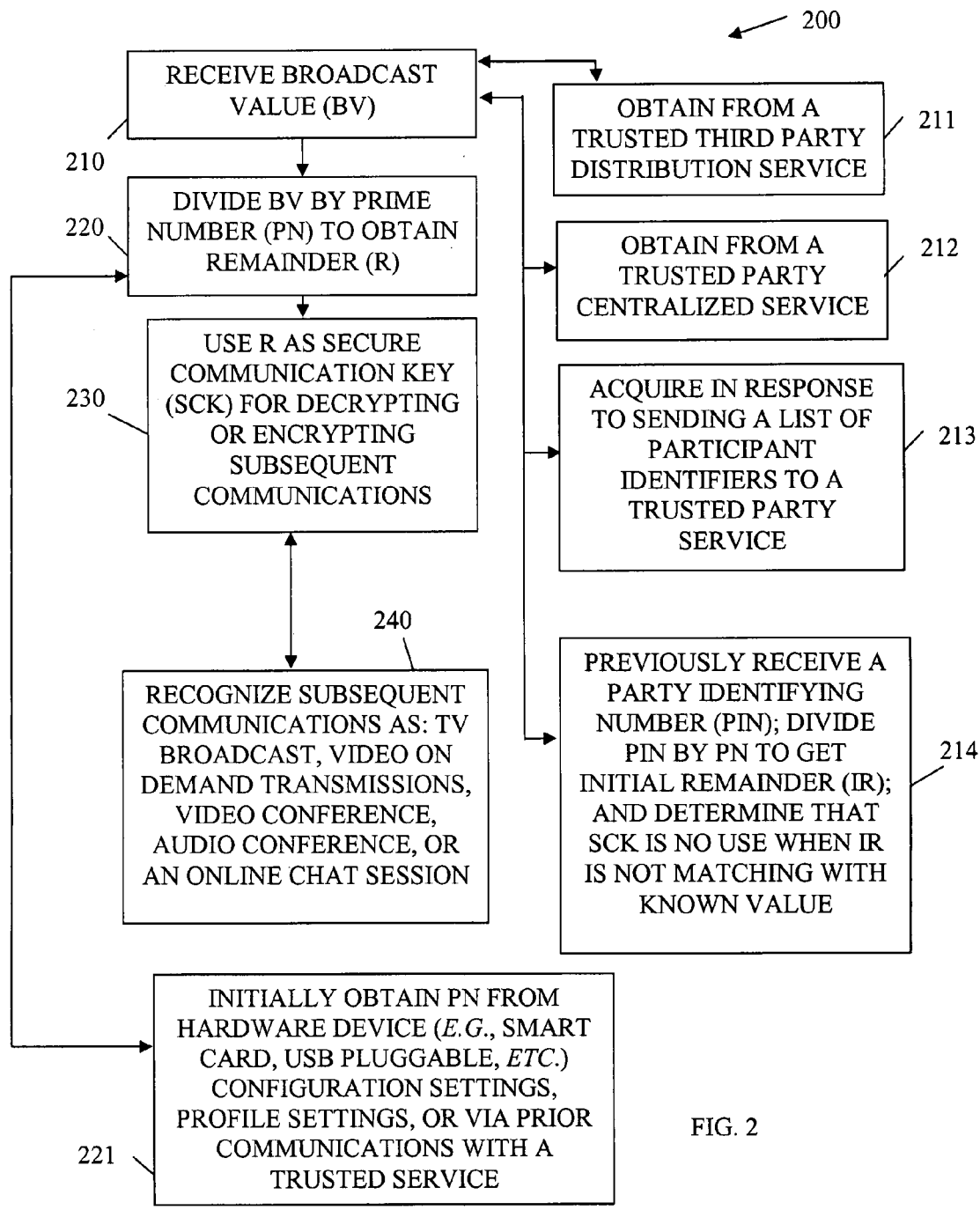
FIG. 2 is a diagram of a method for acquiring and using a secure communication key that is generated and distributed, according to an example embodiment.

FIG. 2 is a diagram of a method 200 for acquiring and using a secure communication key that is generated and distributed, according to an example embodiment. The method 200 (hereinafter "client service") is implemented in a machine-accessible and readable medium and is accessible over a network. The network may be wired, wireless, or a combination of wired and wireless. The client service consumes the secure communication key distributed by the server key generation and distribution service represented by the method 100 of the FIG. 1.

At 210, the client service receives a broadcast value having an embedded and derivable secure communication key. The broadcast value may be received in a variety of manners. The value itself may be broadcast and detected on the wire by the client service without any prior advance notice, it may be selectively multicast, or it maybe directly sent to the client service my one or more other resources.

For example, at 211, the client service may obtain the broadcast value from a trusted third party distribution service. That is, the server key generation and distribution service may have enlisted the help of a trusted third party to distribute the broadcast value to the client service. Again, this may occur when there is a large value that becomes unmanageable if produced for a large number of client services. To remedy the situation, the server key generation and distribution service asks trusted third parties to embed the secure communication key in broadcast values for particular subsets of the client services. So, the client service may actually obtain the broadcast value from a trusted third party service and not the server key generation and distribution service.

Alternatively, at 212, the client service may obtain the broadcast value from a trusted party centralized service, such as the server key generation and distribution service, which was described in detail above with reference to the method 100 of the FIG. 1.

According to an embodiment, at 213, the client service may have actually received the broadcast value in response to a prior request that the client service made to the server key generation and distribution service. The request is made by the client service because the client service wants to broadcast or multicast to a subset of client service selected participants. The request includes a list of participant identifiers that a trusted party service, such as the server key generation and distribution service, uses to acquire proper prime numbers and produce the broadcast value having the secure communication key that the client service may use to broadcast or multicast securely to the select parties. So, the client service may actually prompt or initiate the transmission of the broadcast value and may be actively looking for it over the network.

In some cases, the client service may first inspect a party identifying number before it begins to look for the broadcast value. The party identifying number is divided by a prime number associated with the client service. The client service knows its own prime number and keeps this confidential and does not transmit it over the network wire. However, the client service is not aware of any other prime numbers associated with other parties. The remainder of the division produces a value that is either 0 or some other number, such as 1 or 2, etc., which is known to all of the parties. If the client service is able to obtain a remainder equal to 0 or the number known to all, then the client service is alerted to the fact that it is to be the subject of secure communications with one or more other parties and is altered to the fact that the client service should be actively looking for a broadcast value, which is received at 210. It may also be the case that the party identifying number is sent with the broadcast value. When this occurs if the client service is unable to obtain a zero remainder or a remainder that is less than a threshold value then the client service knows it will be unable to use the broadcast value and that it is not to participate in subsequent secure communications.

At 220, the client service divides the broadcast value by its prime number to obtain a remainder. At 221, the client service may have initially acquired its unique prime number via a variety of mechanisms. For example, the prime number may be obtained from a hardware device, such as a smart card, a Universal Serial Bus (USB) pluggable device, physical tamper resistant secure device, etc. The prime number may also be part of the client services configuration settings or profile settings. Additionally, the prime number may have been initially received via prior secure communications with a trusted service, such as and identity service or identity vault during authentication.

The remainder is the secure communication key that the client service may use, at 230, for decryption (and perhaps encryption when two-way communication is occurring) of subsequent communications received via a broadcast or multicast.

According to an embodiment, at 240, the client service may recognize the subsequent communications as being associated with a variety of types of communications, such as television broadcast programming, video on demand transmissions, video conferencing, audio conferencing, online chat sessions, etc.

It is noted that the network transmissions for the network communications may be any format, such as Internet via Internet Protocol (IP), Satellite, Cable, Cellular, Radio Frequency (RF), of various combinations of these.

Figure 3:
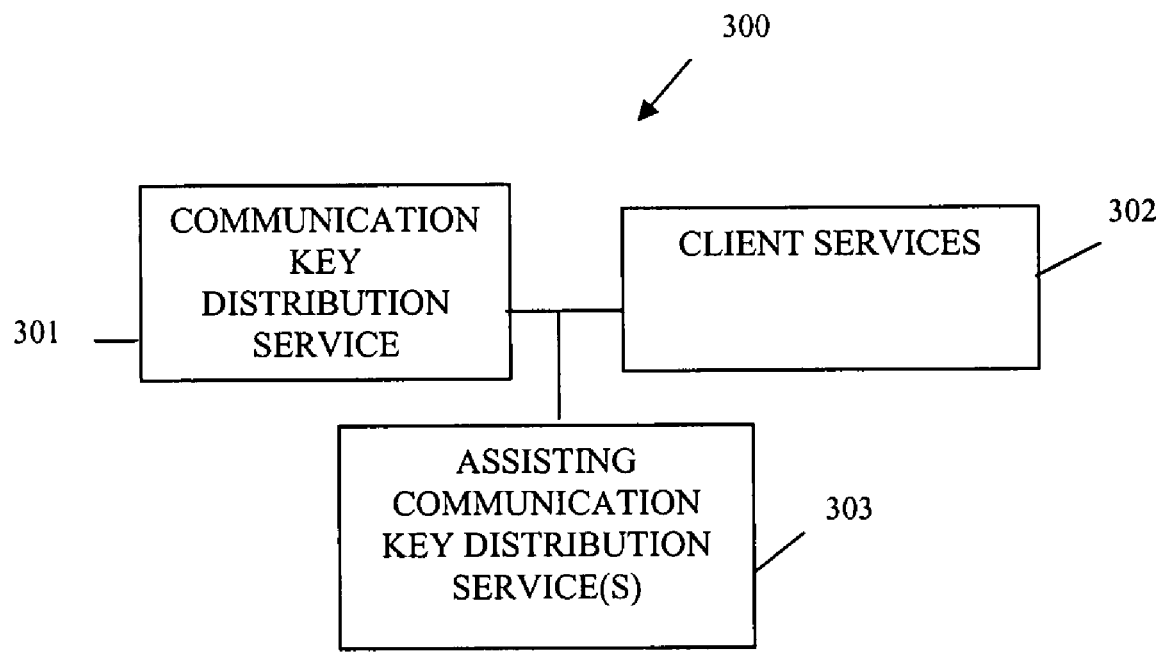
FIG. 3 is a diagram of a secure communication key generation and distribution system, according to an example embodiment.

FIG. 3 is a diagram of a secure communication key generation and distribution system 300, according to an example embodiment. The secure communication key generation and distribution system 300 is implemented in a machine-accessible and readable medium and is accessible over a network. The network may be wired, wireless, or a combination of wired and wireless. In an embodiment, the secure communication key generation and distribution system 300 implements, among other things, various aspects of the methods 100 and 200 of the FIGS. 1 and 2, respectively.

The secure communication key generation and distribution system 300 includes a communication key distribution service 301 and a plurality of client services 302. In some cases, the secure communication key generation and distribution system 300 may also include one or more assisting key distributing services 303. Each of these and their interactions with one another will now be discussed in turn.

The communication key distribution service 301 is adapted to produce a secure communication key that may be securely distributed via a network transmission via custom encryption. The secure communication key is broadcast or multicast over the network transmission within a broadcast value. It is noted that although the term broadcast value is used throughout this disclosure that the value may actually be transmitted via a multicast as well.

The communication key distribution service 301 selectively customizes each broadcast value according to the intended or desired participants. Each participant is associated with a particular client service 302. Moreover, the communication key distribution service 301 is aware of each participant's unique prime number association, whereas each participant is just aware of its own unique prime number association.

The communication key distribution service 301 acquires prime numbers for each of the participants associated with a secure communication request and a secure communication key, which is generated or acquired by the communication key distribution service 301. The prime numbers are multiplied together to produce a prime sum. This is augmented by an additional number N. By augmentation it is meant that the prime sum is multiplied against N. Next, the secure communication key is added to the augmented prime sum. The resulting value is the broadcast value that the communication key distribution service 301 communicates to the client services 302 for subsequent use by the intended participants. It is also noted that the communication key distribution service 301 ensures that the generated or acquired secure communication key is less than each of the prime numbers used with the prime sum and N. The secure communication key may itself be a prime number as well.

According to an embodiment, N is either a prime number (unique from the other prime numbers associated with each of the intended or desired parities) or it may be some selectable combination of available prime numbers (also unique). The size of the combination may be half of the available prime numbers.

Example processing associated with the communication key distribution service 301 was presented above with respect to the method 100 of the FIG. 1.

According to an embodiment, the communication key distribution service 301 may also first communicate membership limitations for subsequent communications or for the transmission of the broadcast value. This may be done by communicating a party identifying number (PIN). Each client service 302 inspects this PIN received over the network to determine if that particular client service 302 is to be expecting a broadcast value, is to communicate in a desired secure communication session, and is to be included in membership for subsequent communications.

The client services 302 receive broadcast values and/or PIN's over the network from the communication key distribution service 301. Upon receipt of these values, each client service 302 divides the values by its prime number. If the remainder is 0 or some small value (or even known range of values) associated with a predefined threshold, then the client service 302 assumes that this is a membership notification and that a subsequent broadcast value will follow over the network wire, which will provide the client service 302 with a secure communication key for use with subsequent secure communications occurring over the network with multiple participants or parties. If no membership transmission is being used or occurs, then the remainder value of the division is assumed to produce a secure communication key. That secure communication key may be subsequent used by each client service 302 to decrypt and perhaps encrypt communications occurring over the network and among the intended parties.

Example processing associated with a client service 302 was presented above with reference to the method 200 of the FIG. 2.

According to an embodiment, the secure communication key generation and distribution system 300 also includes one or more assisting communication key distribution services 303. Each assisting communication key distribution service 303 is enlisted to assist the communication key distribution service 301 in distributing secure communication keys to the proper participants via their client services 302. Each assisting communication key distribution service 303 may be responsible for a small subset of the available client services 302 (participants).

Moreover, it may be that each assisting communication key distribution service 303 produces its own unique broadcast value that it communicates to its participant or client service 302. So, different versions of the broadcast value may appear over the network, each version produced by a particular assisting communication key distribution service 303 and directed to its intended client services 302. However, regardless of the version, each client service 302 may when using the proper version acquire the secure communication key using the techniques of division and remainder discussed herein and above.

A variety of mechanisms may be used by the communication key distribution service 301 to communicate a need for assistance to the assisting communication key distribution service 303. For example, each assisting communication key distribution service 303 may be associated with its own prime number and the initial broadcast value may be directed from the communication key distribution service 301 to the assisting communication key distribution service 303. Upon receipt of the broadcast value, each assisting communication key distribution service 303 may be configured to know the parties that it is to service or it may receive this information from the communication key distribution service 301 or from an identify vault or identity service (another third party service). Each assisting communication key distribution service 303 may then acquire the proper prime numbers for its intended parties via prior configuration or via an identity vault or service and each assisting communication key distribution service 303 then produces a unique version of the broadcast value in a manner similar to what was described above for the communication key distribution service 301 and sends that version to its intended parties (client services 302).

In another arrangement, each assisting communication key distribution service 303 may acquire the identities of the parties that it is to service and the secure communication key from an identity service or vault in response to a request from the communication key distribution service 301. Each assisting communication key distribution service 303 then proceeds to construct a proper version of the broadcast value and communicates it to the intended parties that are being service via those parties' client services 302. It may also be that the secure communication key is directly received by each assisting communication key distribution service 303 from the communication key distribution service 301. This may occur when there is a secure and trusted relationship.

It may also be that the communication key distribution service 301 elects to divide the broadcast value up into different versions on its own accord to reduce the size of the value. Each version includes a subset of parties (via their prime number representations), such that all versions properly identify all parties of the intended secure communication key.

In fact a variety of alternatives or architectures may be used when the communication key distribution service 301 determines that it is advantageous to reduce the size of the computed broadcast value. The point is that the secure communication key is embedded in a novel manner within the broadcast value and is derivable and obtainable only by the intended and proper recipients (parties, participants via their client services 302).

Figure 4:
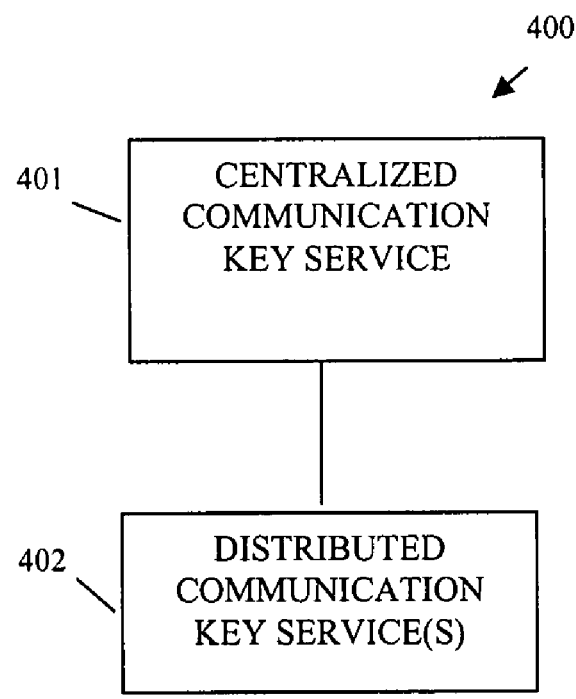
FIG. 4 is a diagram of another secure communication key generation and distribution system, according to an example embodiment.

FIG. 4 is a diagram of another secure communication key generation and distribution system 400, according to an example embodiment. The secure communication key generation and distribution system 400 is implemented in a machine-accessible and readable medium is accessible over a network. The network may be wired, wireless, or a combination of wired and wireless. In an embodiment, the secure communication key generation and distribution system 400 implements various aspects associated with the methods 100 and 200 of the FIGS. 1 and 2, respectively, and the system 300 of the FIG. 3.

The secure communication key generation and distribution system 400 includes a centralized communication key service 401 and one or more distributed communication key services 402. Each of these and their interactions with one another will now be discussed in detail.

The secure communication key generation and distribution system 400 shows an embodiment of the teachings where the initial distribution of the secure communication key to intended parties is divided among multiple services. The driving service that initiates the generation of the secure communication key and the corresponding broadcast value is the centralized communication key service 401.

The centralized communication key service 401 is to communicate the secure communication key for secure broadcasting and multicasting communications over a network. To do this, a request is first processed that identifies the participants that are to have and use the secure communication key. Once this is done a variety of alternative processing may occur to ensure a broadcast value is eventually received by each participant over the network, such that each participant can acquire the secure communication key.

For example, the centralized communication key service 401 may initially construct a broadcast value that utilizes prime numbers associated with the one or more distributed communication key services 402 and then send that broadcast value over the network for processing by each of the one or more distributed communication key services 402. Alternatively, the centralized communication key service 401 may instruct each distributed communication key service 402 to produce a version of the broadcast value by identifying of causing to be identified a subset of participants that each distributed communication key service 402 is to handle and by identifying or causing to be identified the secure communication key. Additionally, the prime numbers for subsets of the participants may be known in advance by a particular distributed communication key service 402 or may be dynamically acquired via an on-demand basis.

The centralized communication key service 401 is trusted and in secure communications with each of the distributed communication key services 402. That is, the centralized communication key service 401 may use secure communication techniques to communicate the secure communication key to each of the distributed communication key services 402, such as via a third party (identity service, identity vault, policy service, etc.).

Each distributed communication key service 402 is preconfigured or dynamically configured by the centralized communication key service 401 to assist with communicating a version of the broadcast value to a particular subset of the intended participants. Any version of a broadcast value can be handled by just the participants to whom it relates. It may also be the case that the centralized communication key service 401 uses a third party, such as a policy or identity service, to dynamically configure each distributed communication key service 402 for a particular subset of the intended participants.

To make a version of the broadcast value for transmission to a subset of intended participants, each distributed communication key service 402 acquires the identities of the participants in the subset, the unique prime numbers for each of those participants, and the secure communication key. This information may be acquired dynamically and/or some of it may be acquired statically or in a predefined and preconfigured manner. Moreover, this information or portions of this information may be received directly or indirectly via a third party upon action or instruction from the centralized communication key service 401.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method comprising:
receiving, by a first computer system executing a communication key distribution service, a request for a new secure communication key from at least one of multiple parties requesting secure communications with each other;
identifying, by the first computer system, the multiple parties requesting secure communications with one another in response to and based on the request;
acquiring, by the first computer system and in response to the request, a prime number associated with each party;
calculating, by the first computer system, a prime sum by multiplying each prime number together;
augmenting, by the first computer system, the prime sum by multiplying the prime sum against an additional number;
acquiring, by the first computer system, from a third-party service a secure communication key;
modifying, by the first computer system, the acquired secure communication key to produce a modified secure communication key;

ensuring, by the first computer system, that the modified secure communication key is less than each of the prime numbers;

adding, by the first computer system, the modified secure communication key to the augmented prime sum to produce a broadcast value; and communicating the broadcast value as the new secure communication key and in response to the request from the first computer system to a second computer system, the second computer system providing client services including secure two-way communication using encryption and decryption that utilizes the secure communication key.

2. The method of claim 1, wherein augmenting further includes one of the following:

selecting the additional number as an additional and different prime number from what is associated with the parties; or selecting the additional number as a combination of additional prime numbers where a size of the combination is half the additional prime numbers available for selection.

3. The method of claim 1, wherein communicating further includes broadcasting over a network the broadcast value.

4. The method of claim 3, wherein broadcasting further includes:

augmenting the prime sum by multiplying the prime sum by a different number to get a party identifying number; and broadcasting the party identifying number with the broadcast value over the network.

5. The method of claim 1, wherein communicating further includes sending the broadcast value to trusted third parties, wherein each trusted third party acquires the secure communication key from the broadcast value and ensures that a select number of the parties associated with a particular trusted third party obtains the secure communication key.

6. The method of claim 1, wherein identifying further includes receiving identifiers representing the parties from a requesting one of the parties that requests to securely multicast using the secure communication key to encrypt communications among the parties.

7. The method of claim 1 further comprising, re-generating and re-communicating, by the first computer system, a revised secure communication key when one of the parties is added or dropped from the parties and wherein a revised broadcast key that includes the revised secure communication key lacks any usage of a particular prime number that was associated with the dropped party.

8. The method of claim 1, further comprising:

receiving, by the second computer system, the broadcast value;

obtaining, by the second computer system, a prime number from a trusted third-party service;

dividing, by the second computer system, the broadcast value by the prime number to obtain a remainder, the prime number kept confidential on the second computer system and is not transmitted by the second computer system over a network connection; and using, by the second computer system, the remainder as a secure communication key for decrypting and encrypting subsequent communications broadcast or multicast over the network and the secure communication key also used for subsequent two-way communications with other parties of the network.

9. The method of claim 8, wherein receiving further includes:

previously receiving a party identifying number;

dividing the partying identifying number by the prime number to obtain an initial remainder; and determining that the secure communication key is of no use to perform decryption on the subsequent communications when the initial remainder is not a known number.

10. The method of claim 8, wherein receiving further includes obtaining the broadcast value from a trusted third party distribution service.

11. The method of claim 8, wherein receiving further includes obtaining the broadcast value from a trusted party centralized service.

12. The method of claim 8, wherein receiving further includes acquiring the broadcast value in response to sending a list of participant identifiers to a trusted party service for purposes of obtaining the secure communication key via the broadcast value and to use the secure communication key to encrypt and decrypt communications that are subsequently multicast amongst participants associated with the list.

13. The method of claim 8 further comprising, recognizing, by the second computer system, the subsequent communications as being associated with one or more of the following: a televised program broadcast, a video on demand transmission, a video conference, an audio conference, or an on-line chat session.

14. A system, comprising:

a first computer system executing a communication key distribution service; and a second computer system providing client services including secure two-way communication using encryption and decryption that utilizes a secure communication key from the first computer system, the first computer system providing the communication distribution service by:

receiving a request for a new secure communication key from at least one of multiple parties requesting secure communications with each other;

identifying the multiple parties requesting secure communications with one another in response to and based on the request;

acquiring, in response to the request, a prime number associated with each identified party;

calculating a prime sum by multiplying each prime number together;

augmenting the prime sum by multiplying the prime sum against an additional number;

acquiring from a third-party service a secure communication key;

modifying the acquired secure communication key to produce a modified secure communication key;

ensuring that the modified secure communication key is less than each of the prime numbers;

adding the modified secure communication key to the augmented prime sum to produce a broadcast value; and communicating the broadcast value as the new secure communication key and in response to the request to the second computer system.

15. The system of claim 14 further comprising, one or more assisting communication key distribution services, wherein the communication key distribution service enlists assistance from the one or more communication key distribution services for communicating the secure communication key to the plurality of client services.

16. The system of claim 15, wherein each of the one or more assisting communication key distribution service is responsible for producing a version of the broadcast value for a particular set of the plurality of client services, wherein each version of the broadcast value includes the secure communication key.

17. The system of claim 14, wherein the first computer system first communicates membership limitations for the subsequent communications by communicating a party identifying number that each client service inspects to determine when a particular client service is included in the subsequent communications.

18. The system of claim 14, wherein the first computer system determines the broadcast value by multiplying each prime number together and multiplying the product by the additional number and then adding the secure communication key.

19. The system of claim 14, wherein the additional number is selected as another additional and unique prime number or selected as a combination of available prime numbers.

20. The system of claim 14, wherein the second one or more computer systems provide the plurality of client services by:
   receiving the broadcast value;
   obtaining a prime number from a trusted third-party service;
   dividing the broadcast value by the prime number to obtain a remainder, the prime number kept confidential on the second computer system and is not transmitted by the over a network connection; and
   using the remainder as a secure communication key for decrypting and encrypting subsequent communications broadcast or multicast over the network and the secure communication key also used for subsequent two-way communications with other parties of the network.

* * * * *

UNITED STATES PATENT AND TRADEMARK OFFICE
CERTIFICATE OF CORRECTION

PATENT NO. : 8,396,221 B2
APPLICATION NO. : 11/897445
DATED : March 12, 2013
INVENTOR(S) : Sudhakar et al.

Page 1 of 1

It is certified that error appears in the above-identified patent and that said Letters Patent is hereby corrected as shown below:

On title page, in column 2, References Cited under "Other Publications", line 4, delete "Retreived" and insert -- Retrieved --, therefor.

In the Specification

In column 2, line 35, delete "maybe" and insert -- may be --, therefor.

In column 5, line 34, delete "maybe" and insert -- may be --, therefor.

In the Claims

In column 12, line 62, in Claim 15, after "more" insert -- assisting --.

Signed and Sealed this
First Day of September, 2015

Michelle K. Lee
*Director of the United States Patent and Trademark Office*